US008973332B2

(12) United States Patent
Lee

(10) Patent No.: US 8,973,332 B2
(45) Date of Patent: Mar. 10, 2015

(54) FRAMEWORK CONNECTING DEVICE OF PREFABRICATED BUILDING STRUCTURE

(76) Inventor: Dae young Lee, Daegu (KR)

(*) Notice: Subject to any disclaimer, the term of this patent is extended or adjusted under 35 U.S.C. 154(b) by 0 days.

(21) Appl. No.: 14/122,785

(22) PCT Filed: Jun. 1, 2012

(86) PCT No.: PCT/KR2012/004337
§ 371 (c)(1),
(2), (4) Date: Jan. 16, 2014

(87) PCT Pub. No.: WO2012/169746
PCT Pub. Date: Dec. 13, 2012

(65) Prior Publication Data
US 2014/0123587 A1    May 8, 2014

(30) Foreign Application Priority Data
Jun. 7, 2011  (KR) .......................... 10-2011-0054302

(51) Int. Cl.
*E04H 12/00* (2006.01)
*E04B 1/19* (2006.01)
*E04B 1/24* (2006.01)

(52) U.S. Cl.
CPC .................. *E04B 1/1903* (2013.01); *E04B 1/24* (2013.01); *E04B 2001/2415* (2013.01); *E04B 2001/2418* (2013.01); *E04B 2001/2451* (2013.01); *E04B 2001/2487* (2013.01)
USPC .............. 52/653.2; 52/655.1; 52/713; 52/847; 52/849; 52/848; 52/851; 403/205; 403/403

(58) Field of Classification Search
CPC ................. E04B 1/5825; E04B 1/5831; E04B 2001/5875; E04B 2001/2415; E04B 2001/2451

USPC .......... 52/639, 650.3, 653.1, 655.1, 713, 847, 52/848, 849, 653.2, 851; 403/205, 403
See application file for complete search history.

(56) References Cited

U.S. PATENT DOCUMENTS

| | | | | |
|---|---|---|---|---|
| 3,690,078 A | * | 9/1972 | Maynard, Jr. .................. | 135/137 |
| 3,786,512 A | * | 1/1974 | McCue et al. .............. | 346/33 D |
| 4,069,638 A | * | 1/1978 | Hasselqvist et al. ........... | 52/843 |
| 4,773,192 A | * | 9/1988 | Andrews ........................ | 52/93.1 |
| 5,503,493 A | * | 4/1996 | Kato et al. .................... | 52/655.1 |
| 8,899,868 B2 | * | 12/2014 | Trivette ........................ | 403/231 |

OTHER PUBLICATIONS

International Search Report for corresponding International Application No. PCT/KR2012/004337.

* cited by examiner

*Primary Examiner* — Chi Q Nguyen
(74) *Attorney, Agent, or Firm* — Egbert Law Offices, PLLC

(57) ABSTRACT

Disclosed is a framework connecting device of a prefabricated building structure. Each connection portion of frameworks, which are formed in the shape of a square pipe so as to form columns, rafters or the like, is connected and fixed by front and rear connection pieces and a plurality of bolts and nuts which penetrate the same, wherein, during assembly, the frameworks and the front and rear connection pieces are coupled by indented groves and protrusion portions. Base protrusions of the front and rear connection pieces are supported by the frameworks. One or more support pipes which are respectively connected and fixed by bolts and the nuts are provided between the front and rear connection pieces. Therefore, the assembling work may be readily and easily carried out while the strength of the connection portions is being reinforced.

1 Claim, 6 Drawing Sheets

FRAMEWORK CONNECTING DEVICE OF PREFABRICATED BUILDING STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN SUBMITTED ON COMPACT DISC

Not applicable.

BACKGROUND OF THE INVENTION

1. Field of the Invention

The present invention relates to a framework connecting device of a prefabricated building structure that is capable of connecting frameworks with each other when the prefabricated building structure is constructed.

2. Description of Related Art Including Information Disclosed Under 37 CFR 1.97 and 37 CFR 1.98

Generally, frameworks, which constitute columns, rafters, and the like in all kinds of prefabricated building structures, such as warehouses, warehouse type buildings, stables, etc., are connected with each other by means of connection pieces, bolts and nuts and then covered with vinyl or finished with various exterior materials.

Until now, however, the frameworks of the prefabricated building structure are connected with each other by means of connection pieces having a shape of just a plate in such a manner as to be separated back and forth from each other and a plurality of bolts and nuts passed through the connection pieces, thus making it hard to perform the assembling work. Further, strength reinforcement is needed additionally in accordance with desired strengths of the prefabricated building structures, and specifically, the strength on the connected portion of the neighboring frameworks is substantially weak, so that the safety of the prefabricated building structure cannot be ensured reliably.

That is, if the columns, rafters and vertical rods constituting the prefabricated building structure are made by cutting the frameworks formed of just generally square pipes, the frameworks should be made of a substantially thick steel plate so as to obtain a desired strength, thus undesirably increasing the material cost and weight and further making it difficult to handle and construct the frameworks.

Furthermore, the front and rear connection pieces connecting the frameworks with each other are formed of just plates having different outer shapes according to the angles of encounter between the frameworks in such a manner as to be brought into close contact with the side surfaces of the frameworks, and after the end portions of the frameworks to be connected to each other are disposed between the front and rear connection pieces, next, the frameworks and the front and rear connection pieces are connected to each other by means of the plurality of bolts and nuts passed through the connection holes formed thereon. However, it is very complicated and hard to perform connection and fixation of the frameworks to the front and rear connection pieces by means of the bolts and nuts in the state where the connection holes formed on the frameworks and the front and rear connection pieces communicate with each other, thus remarkably reducing the work efficiency.

Additionally, even though the thicknesses of fit e front and rear connection pieces are increased to reinforce the strength of the connection portion of the frameworks and the plurality of bolts and nuts is used upon the connection, the connection portion of the frameworks may be deformed between the front and rear connection pieces due to the strong fastening of the bolts and nuts. Further, the strength on the connection portion of the frameworks formed of just square pipes becomes weak due to the connection holes formed thereon, thus failing to ensure the safety of the prefabricated building structure.

Accordingly, the present invention has been made in view of the above-mentioned problems occurring in the prior art, and it is an object of the present invention to provide a framework connecting device of a prefabricated building structure that is capable of reducing the material cost and weight required for a framework having a desired strength, performing assembling work readily and easily, and reinforcing the strength on the connection portion of frameworks.

SUMMARY OF THE INVENTION

To accomplish the above object, according to the present invention, there is provided a framework connecting, device of a prefabricated, building structure including: frameworks formed of a generally square pipe to constitute columns and rafters and having reinforcing indented grooves formed on each face thereof and connection holes formed on the reinforcing indented grooves; front and rear connection pieces interposing the connection portions of the frameworks to be connected therebetween and having connection holes formed thereon, the front and rear connection pieces having base protrusions adapted to support the frameworks thereagainst and contact portions and reinforcing portions adapted to be brought into contact with the side surfaces of the frameworks, while interposing the base protrusions therebetween, the contact portions having protrusion portions coupled to the reinforcing indented grooves of the frameworks and the contact portions and the reinforcing portions having connection holes formed thereon; a plurality of bolts and nuts adapted to fixedly connect the frameworks and the front and rear connection pieces to each other by passing the bolts through the connection holes of the frameworks and the connection holes of the front and rear connection pieces and by fastening the nuts to the bolts; a plurality of support pipes fitted between the front and rear connection pieces in such a manner as to communicate with the connection holes, while avoiding the frameworks; and a plurality of bolts and nuts adapted to couple the front and rear connection pieces to each other by passing the bolts through the connection holes and the support pipes and by fastening the nuts to the bolts.

Advantageous Effects

According to the present invention, the framework connecting device of a prefabricated building structure has the reinforcing indented, grooves formed on the four faces of each framework constituting the column, rafter and beam, thus reducing the material cost for the reinforcement of the strength of the frameworks and further decreasing the weight of the frameworks to easily handle the frameworks.

Additionally, the front and rear connection pieces have the protrusion portions adapted to be coupled to the indented grooves of the frameworks and the base protrusions adapted to support the frameworks thereagainst, so that when the frameworks are connected to each other, the protrusion portions of the front and rear connection pieces are coupled to the indented grooves of the frameworks, thus providing the locations of the frameworks to be connected to each other, and further, the connection holes to which the bolts are coupled naturally communicate with each other, thus easily and rapidly completing the assembling work and improving the work efficiency.

Further, the front and rear connection pieces are locked onto the connection portions of the frameworks by means of the indented grooves of the frameworks and the protrusion portions of the front and rear connection pieces, while supporting the connection portions of the frameworks against the base protrusions thereof, and furthermore, the plurality of distance-maintaining support pipes are fitted between the front and rear connection pieces in such a manner as to connect the front and rear connection pieces by means of the bolts and nuts, while avoiding the frameworks, thus more strongly reinforcing the connection strength of the connection portion of the frameworks and ensuring the safety of the prefabricated building structure.

DETAILED DESCRIPTION OF THE INVENTION

Figure 1:
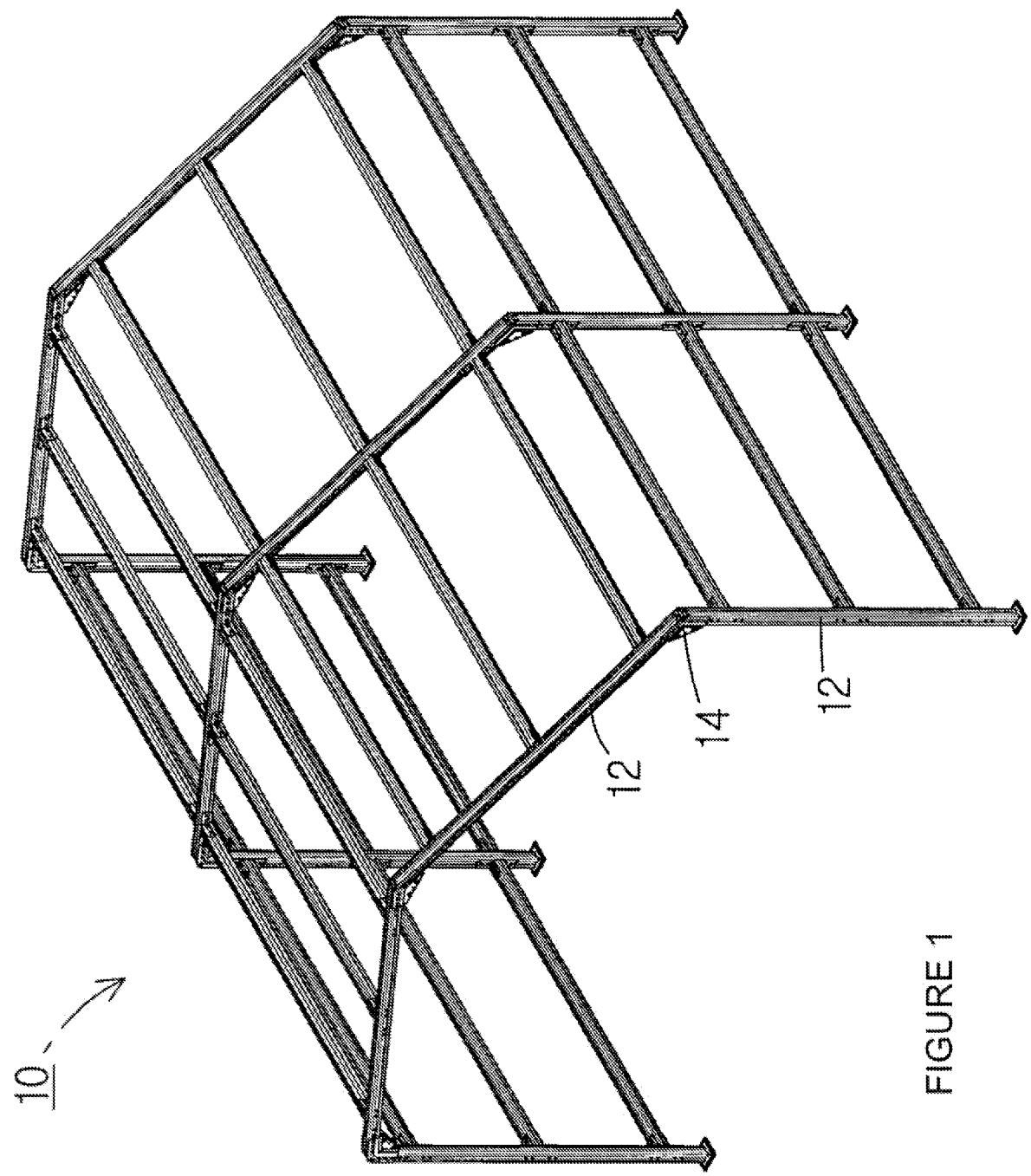
FIG. 1 is a perspective view showing a prefabricated building structure to which a framework connecting device according to a first embodiment of the present invention is adopted.

Hereinafter, an explanation on a framework connecting device of a prefabricated building structure according to preferred embodiments of the present invention will be in detail given with reference to the attached drawings. Frameworks used in the present invention have different locations and coupling, angles according to their purposes, and front and rear connection pieces connecting the connection portion of the frameworks with each other have different outer shapes in correspondence with the different locations and coupling angles of the frameworks. However, they have the same functions as each other, and therefore, similar reference numerals will be assigned to the similar parts to each other. Further, a detailed explanation on the known related technology or functions will be avoided for the brevity of the description.

Figure 2:
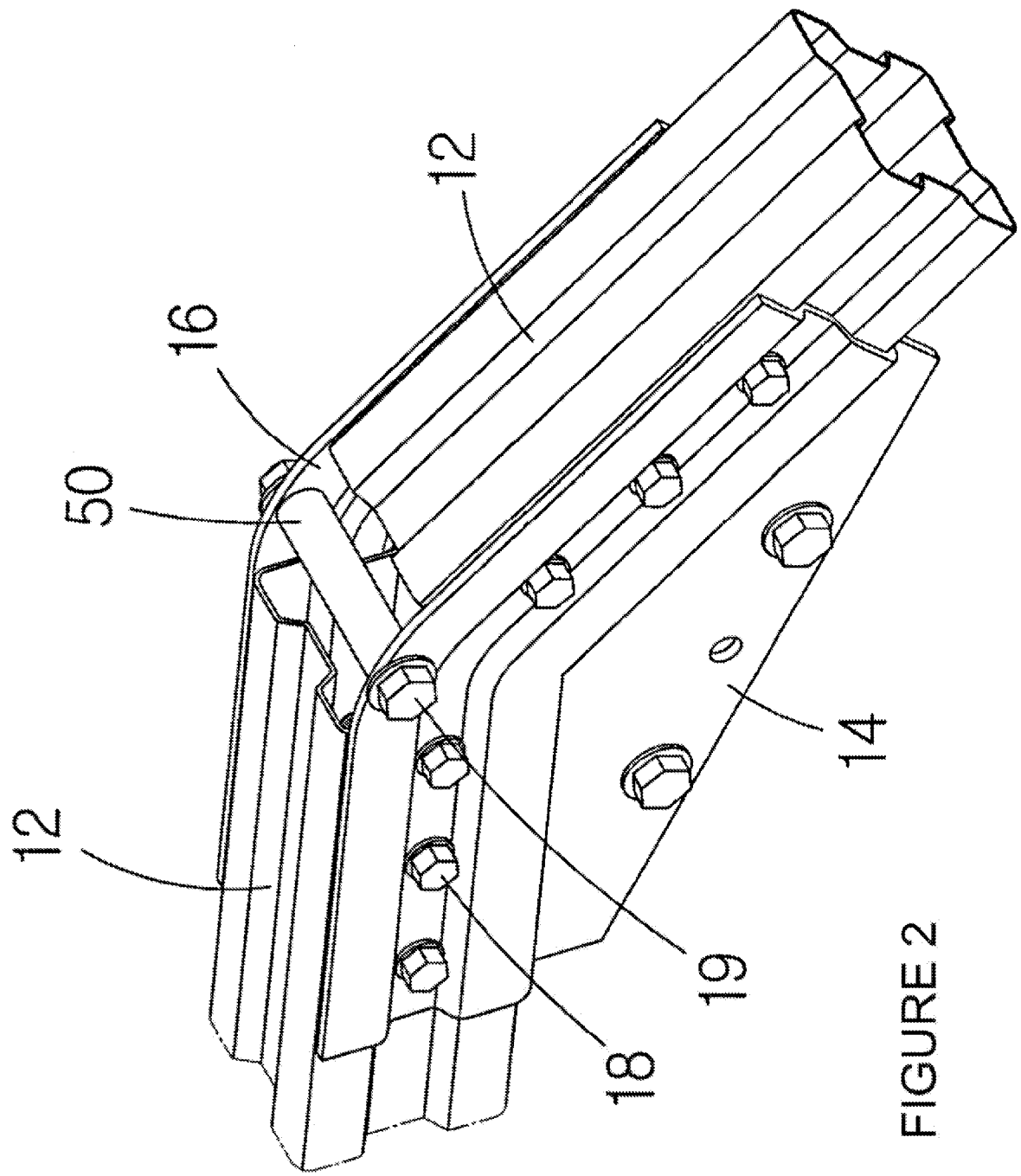
FIG. 2 is a perspective view showing the framework connecting device of the prefabricated building structure according to the first embodiment of the present invention.

FIG. 1 is a perspective view showing a prefabricated building structure to which a framework connecting device according to a first embodiment of the present invention is adopted, and FIG. 2 is a perspective view showing the framework connecting device of the prefabricated, building structure according to the first embodiment of the present invention. As shown, front and rear connection pieces 14 and 16 are coupled to each other, while interposing the connection portions of frameworks 12 constituting columns, rafters, and the like in a prefabricated building structure therebetween, and thus, the connection between the frameworks 12 and the front and rear connection pieces 14 and 16 and the connection between the front and rear connection pieces 14 and 16 are conducted by means of the fixation of a plurality of bolts 18 and 19 and a plurality of nuts 20 and 21 as will be discussed later.

Figure 3:
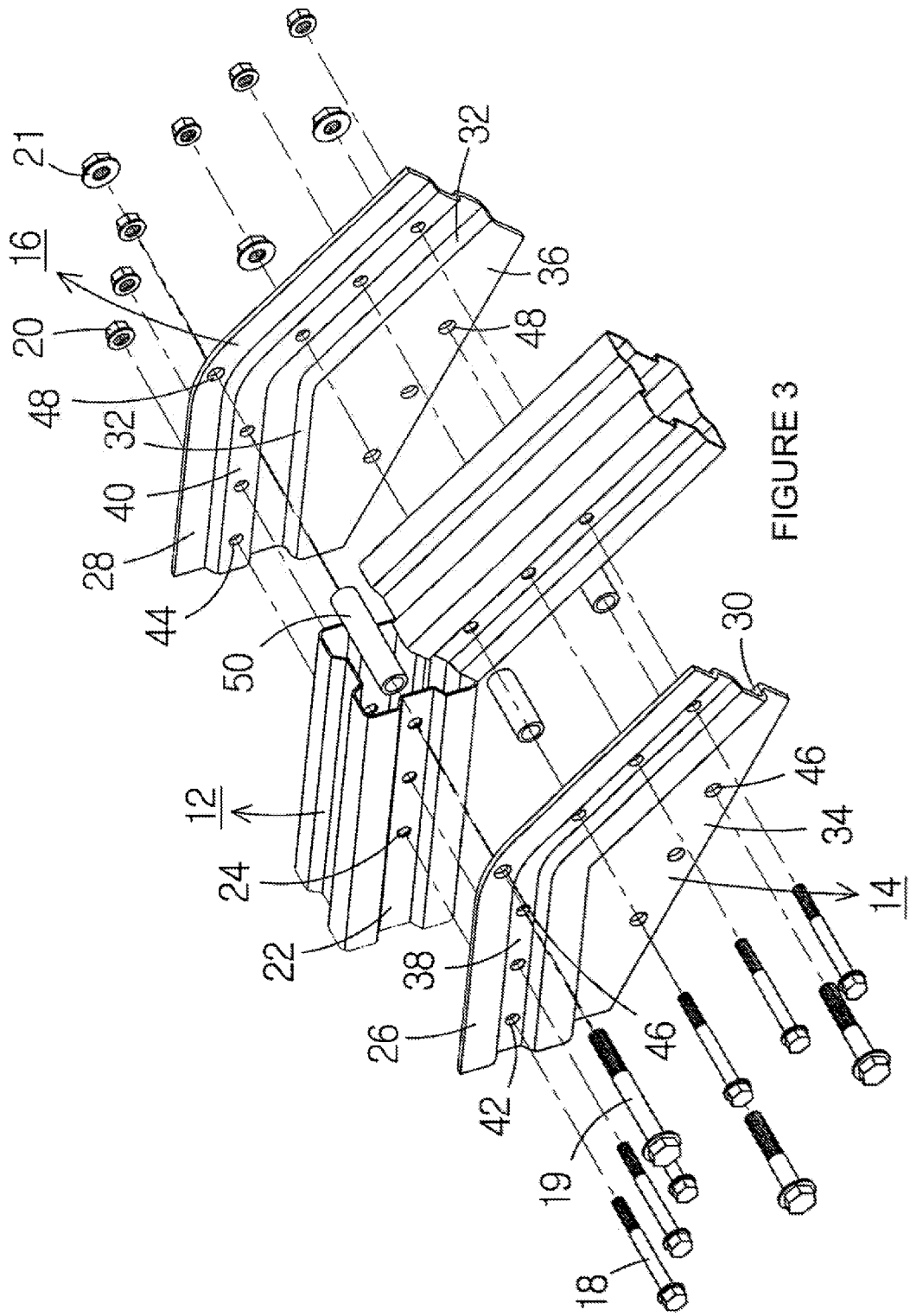
FIG. 3 is an exploded perspective view showing the framework connecting device of the prefabricated building structure according to the first embodiment of the present invention.
Figure 4:
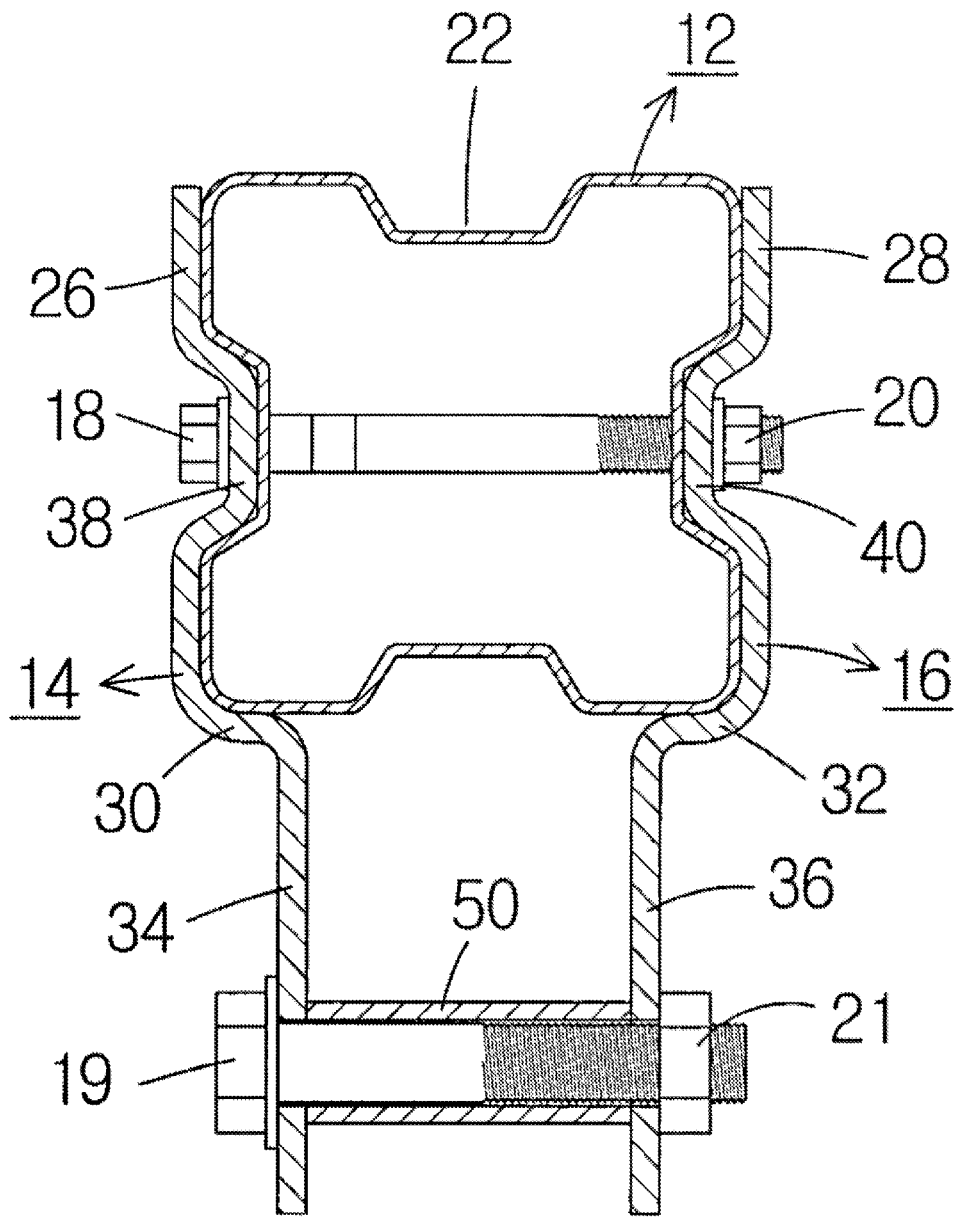
FIG. 4 is a sectional view showing main pans of the framework connecting device of the prefabricated building structure according to the first embodiment of the present invention.

FIG. 3 is an exploded perspective view showing the framework connecting, device of the prefabricated building, structure according to the first embodiment of the present invention, and FIG. 4 is a sectional view showing main parts of the framework connecting device of the prefabricated building structure according to the first embodiment of the present invention. The frameworks 12 constituting the columns, rafters and the like are formed of generally square pipes and cut to desired lengths. Each framework 12 has a reinforcing indented groove 22 formed on each face thereof along a lengthwise direction thereof and further has a plurality of connection holes 24 formed in the indented grooves 22 of both end connection portions thereof, to which the bolts 18 are coupled.

On the other hand, the front and rear connection pieces 14 and 16 connecting the frameworks 12 to each other have contact portions 26 and 28 having the same outer shape as the connection portions of the frameworks 12 in such a manner as to face each other and reinforcing portions 34 and 36 separated from the contact portions 26 and 28, while interposing base protrusions 30 and 32 therebetween.

Further, the contact portions 26 and 28 of the front and rear connection pieces 14 and 16 have protrusion portions 38 and 40 formed along the lengthwise directions thereof in such a manner as to be tightly coupled to the indented grooves 22 of the frameworks 12, and the protrusion portions 38 and 40 have connection holes 42 and 44 formed on both sides thereof in such a manner as to communicate with the connection holes 24 of the frameworks 12. Further, connection holes 46 and 48 are formed on the center portions of the contact portions 26 and 28 and both sides of the reinforcing portions 34 and 36.

The bolts 18 connecting the frameworks 12 and the front and rear connection pieces 14 and 16 are passed through the connection holes 24, 42 and 44 formed on the indented grooves 22 of the frameworks 12 and the contact portions 26 and 28 of the front and rear connection pieces 14 and 16 in such a manner as to communicate with each other and then fastened by means of the nuts 20, thus fixedly connecting the frameworks 12 and the front and rear connection pieces 14 and 16. However, the bolts 19 connecting the front and rear connection pieces 14 and 16 to each other are passed through support pipes 50 fitted to maintain distances between the central portions of the contact portions 26 and 28 of the front and rear connection pieces 14 and 16 and between the connection holes 46 and 48 formed on both sides of the reinforcing portions 34 and 36 and then fastened by means of the nuts 21, thus fixedly connecting the front and rear connection pieces 14 and 16 to each other.

Figure 5:
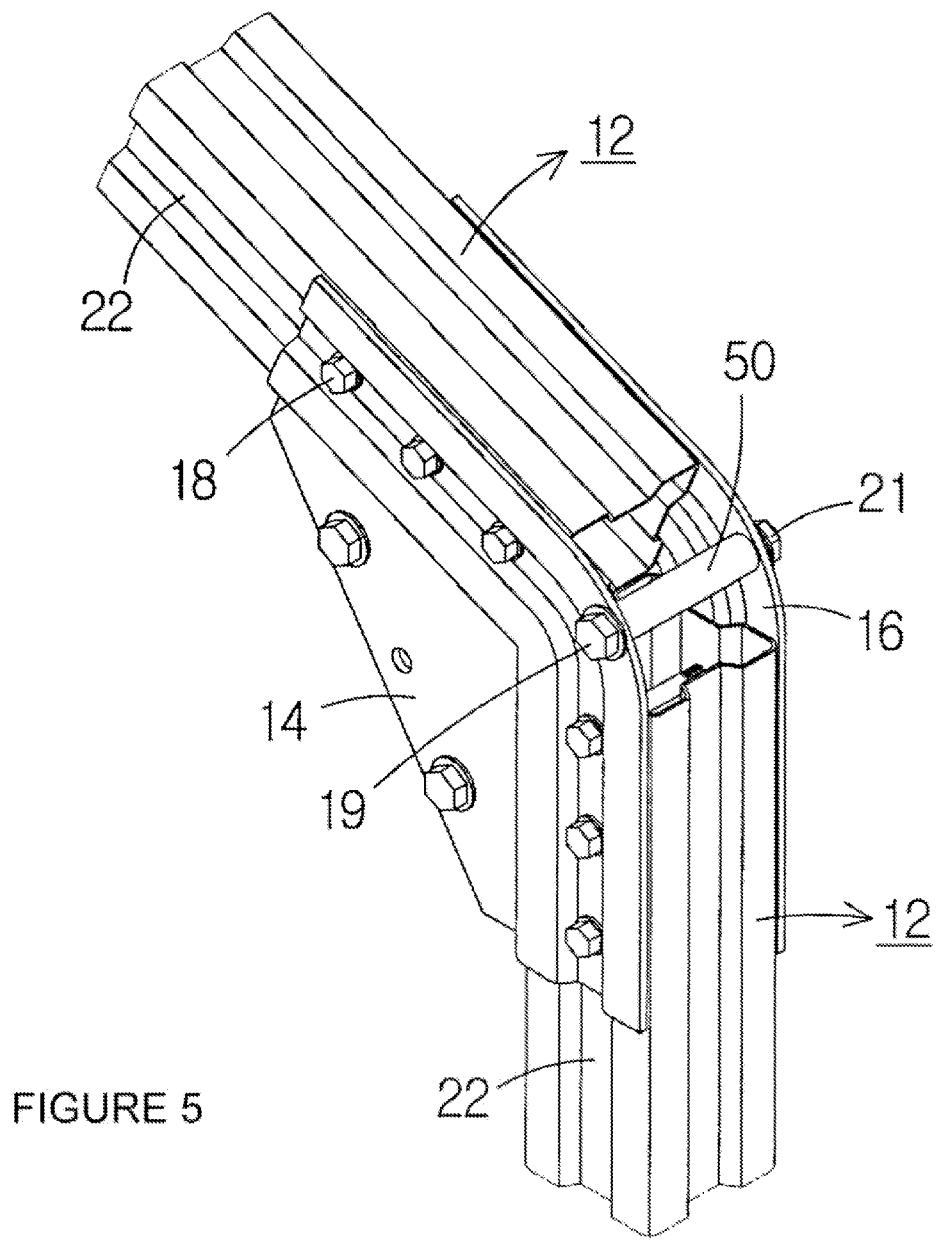
FIG. 5 is a perspective view showing a framework connecting device of a prefabricated building structure according to a second embodiment of the present invention.
Figure 6:
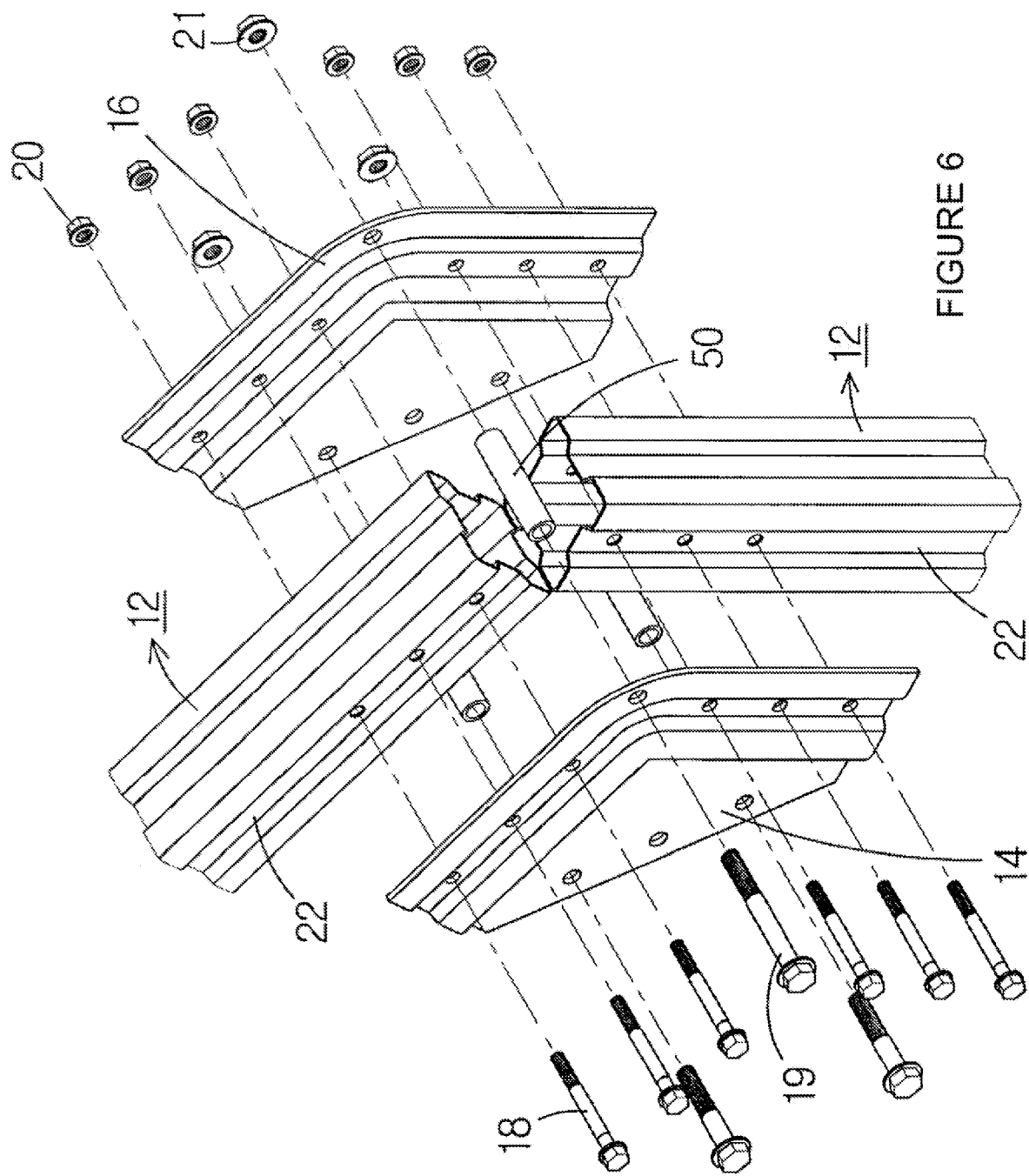
FIG. 6 is an exploded perspective view showing the framework connecting, device of the prefabricated budding structure according to the second embodiment of the present invention.

FIG. 5 is a perspective view showing a framework connecting device of a prefabricated building structure according to a second embodiment of the present invention, and FIG. 6 is an exploded perspective view showing the framework connecting device of the prefabricated building structure according to the second embodiment of the present invention. According to the second embodiment of the present invention, the framework connecting device of the prefabricated building structure can connect the frameworks 12 constituting a rafter and a column as well as the frameworks 12 constituting the left and right rafters.

That is the front and rear connection pieces 14 and 16 are coupled to each other, while interposing the connection portion of the framework 12 constituting the rafter and the connection portion of the framework 12 constituting the column therebetween, and then, the connection and fixation between the frameworks 12 and the front and rear connection pieces 14 and the connection between the front and rear connection pieces 14 and 16 are conducted by means of the plurality of bolts 18 and 19 and the plurality of nuts 20 and 21. In this case, the support pipes 50 are disposed between the front and rear connection pieces 14 and 16 to maintain a given distance therebetween. Accordingly, the framework connecting device of the prefabricated building structure according to the second embodiment of the present invention can connect the frameworks 12 constituting the rafter and the column.

Each framework 12 used to constitute the rafters and columns when the pre fabricated building structure 10 is constructed has the reinforcing indented grooves 22 formed on the four faces of the square pipe, so that the thickness of the steel plate used for the framework 12 can be decreased to reduce the material cost and weight of the framework 12, thus being easily handled during the construction and further reinforcing the strength of the framework 12 through the formation of the indented grooves 22.

In case where the frameworks 12 constituting the left and right rafters are connected to each other and further the framework 12 constituting the rafter and the framework 12 constituting, the column are connected to each other, if the protrusion portions 38 and 40 of the front and rear connection pieces 14 and 16 are coupled to the indented grooves 22 formed on the connection portions of the frameworks 12 facing each other, the frameworks 12 have desired inclined angles with respect to each other and thus assembled to each other by coupling the bolts 18 to the connection holes 24, 42 and 44 communicating with each other through the fastening of the nuts 20, thereby easily and rapidly completing the assembling work.

When the frameworks 12 are connected to each other by means of the front and rear connection pieces 14 and 16, furthermore, the plurality of support pipes 50 is fitted between the front and rear connection pieces 14 and 16 to fixedly connect them by means of the bolts 19 and the nuts 21, thus maintaining the given distance therebetween. As a result, even though the bolts 18 and the nuts 20 connecting the frameworks 12 and the from and rear connection pieces 14 and 16 are strongly fastened to each other, the deformation of the frameworks 12 can be prevented and the connection strength of the connection portions can be improved.

In addition to the connection of the front and rear connection pieces 14 and 16 to the frameworks 12 by means of the bolts 18 and the nuts 20, furthermore, the front and rear connection pieces 14 and 16 are configured to couple the protrusion portions 38 and 40 framed on the left and right sides thereof to the indented grooves 22 of the frameworks 12, thus providing the support force in a direction where load is applied, and the connection portions of the frameworks 12 are supported against the base protrusions 30 and 32 of the front and rear connection pieces 14 and 16, thus more strongly improving the connection strength of the connection portions of the frameworks 12.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A framework connection assembly for a prefabricated building, the framework connection assembly comprising:
a framework formed of generally a plurality of square pipes, said framework having columns and rafters, each of said columns and rafters having faces thereon, each of said faces having reinforcing indented grooves formed thereon, each of said reinforcing indented grooves having first connection holes formed thereon;
front and rear connection pieces interposed respectively in connection portions of said framework, each of said front and rear connection pieces having second connection holes formed thereon, each of said front and rear connection pieces comprising base protrusions adapted to support said framework thereagainst and contact portions and reinforcing portions adapted to be brought into contact with side surfaces of said framework with said base protrusions being interposed therebetween, said contact portions having protrusion portions coupled to said reinforcing indented grooves of said framework, said contact portions and said reinforcing portions having third connection holes formed thereon;
a plurality of bolts and nuts adapted to fixedly connect said framework and said front and rear connection pieces to each other in such a manner so as to pass through said first connection holes of the framework and said second connection holes of said front and rear connection pieces;
a support pipe fitted between said front and rear connection pieces in such a manner as to communicate with said connection holes while avoiding said framework; and
another bolt and another nut adapted to couple said front and rear connection pieces to each other in such a manner so as to pass through said second connection holes and said support pipe.

* * * * *